Patented May 9, 1944

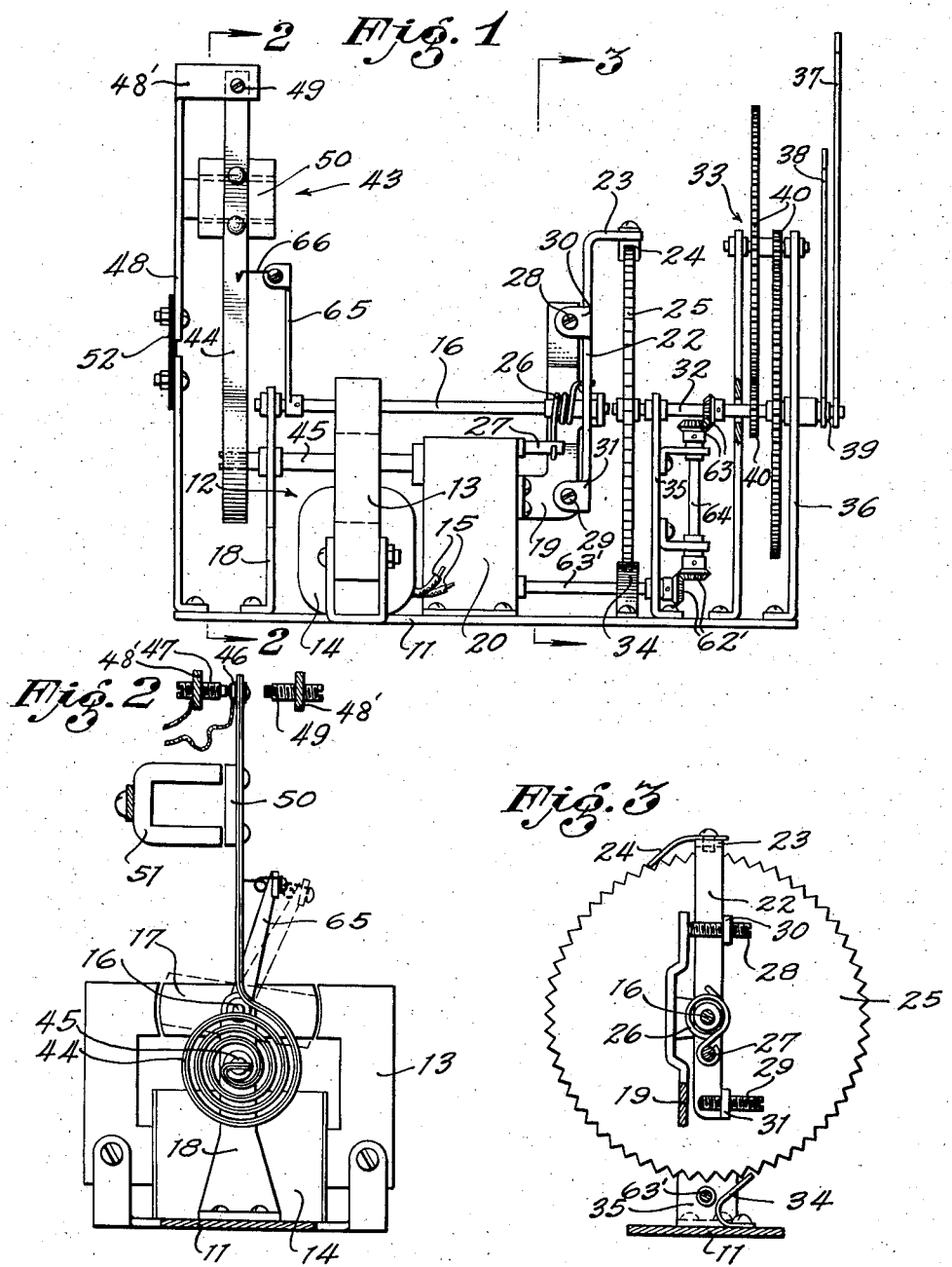

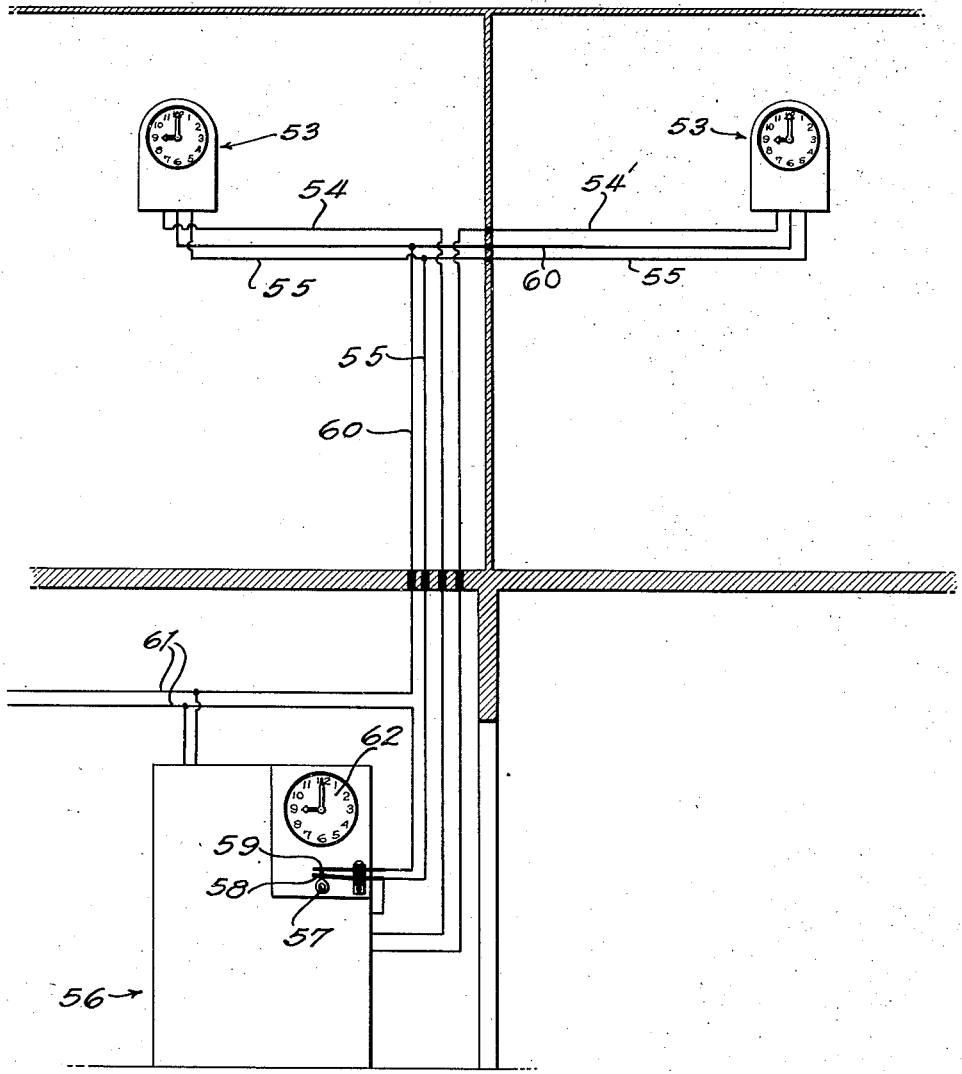

2,348,497

UNITED STATES PATENT OFFICE 2,348,497

CONTROL SYSTEM

William A. Ray, Los Angeles, Calif.

Application January 12, 1942, Serial No. 426,437

1 Claim. (Cl. 236—46)

My present invention relates to control systems, and particularly to space heating systems wherein a thermostat is employed for remotely controlling the heating means.

In such systems it is often desirable to incorporate an electrically operated clock with the thermostat for automatically changing its day and night setting. There is, however, a serious objection to such an arrangement inasmuch as the heat produced by the operation of the clock motor affects the heat responsive element of the thermostat with which it is associated even when precautions are taken to insulate the motor from the thermostatic element. Such heating affects the setting of the thermostat and may also cause erratic operation. It is therefore an object of this invention to provide, in a system of the type indicated, the combination, in a single receptacle, of a thermostat and an electrically-operated impulse-motor-driven clock, the motor being so infrequently energized that the heat produced thereby has no appreciable effect upon the thermostat.

The majority of thermostats include snap-action means, either of the spring or magnetic type, for minimizing arcing between the contacts during the engaging and disengaging movements thereof. However, when such means are employed, the temperature differential of operation of the thermostat is necessarily of such degree that the space temperature cannot be controlled as closely as may be desired. I have found that, if the thermostat is periodically "jarred," the differential due to its snap-action is substantially decreased. It is therefore another object of this invention to provide motor means for periodically jarring the heat-responsive element of such a thermostat.

Other objects and advantages of my invention will be found in the description, the drawings and the appended claim; and for complete understanding of the invention, reference may be had to the following detailed description and accompanying drawings, wherein:

Figure 1 is a side elevation of a thermostat and clock mechanism embodying my invention;

Figure 2 is a view taken along the line 2—2 of Fig. 1;

Figure 3 is a view taken along the line 3—3 of Fig. 1; and

Figure 4 is a diagrammatic view of a heating control system embodying my invention.

Referring first more particularly to Figs. 1-3 of the drawings, the numeral 11 indicates a base plate on which is mounted an electrically operated impulse motor 12, having a core 13, and an energizing coil 14 from which leads 15 extend for connection to a source of energy. Mounted for rotation between the pole faces of the core 13, on a shaft 16, is an armature 17. The shaft 16 is supported by brackets 18 and 19, bracket 18 being secured directly to base 11, and bracket 19 to the side of a gear box 20 mounted on the base. Fixed to the end of shaft 16, adjacent the bracket 19, is an arm 22 having a laterally-bent end portion 23 on which is secured a resilient driver 24, adapted to cooperate with the teeth of a ratchet wheel 25 for transmitting intermittent movement to the same. The arm 22 is adapted to be rotated in one direction by the motor 12, and then returned to its original position by a spring 26 wound around the shaft 16 and having one of its ends abutting a fixed member 27 extending from the side of the gear box 20, and the other end in engagement with the arm. The arc through which the arm 22, and consequently the armature 17, can oscillate is limited by the engagement of a pair of stop-screws 28 and 29, threaded through openings in bent-over portions 30 and 31 respectively of the arm, with the bracket 19. The ratchet wheel 25 is mounted on one end of a shaft 32 and is adapted to drive a clock mechanism shown generally at 33, the movement of the ratchet wheel being limited to rotation in one direction by a resilient pawl 34 mounted on the plate 11. The shaft 32 is supported by a pair of brackets 35 and 36, secured to the base 11. Secured on the other end of the shaft 32, and directly driven thereby, is the minute hand 37 of the clock 33, the hour hand 38 being secured on a collar 39 driven by shaft 32 through reduction gears 40.

The motor 12 is adapted to be energized at one minute intervals, by means hereinafter described, which causes armature 17 to rotate until stop-screw 28 engages the bracket 19, the amount of rotation being adjustable, by means of screws 28 and 29, to one-sixtieth of a revolution. This motion is transmitted directly to minute hand 37 through the driver 24, ratchet wheel 25 and shaft 32. Obviously, if desired, the clock mechanism could be arranged for operation at other frequencies. Upon deenergization of the motor, spring 26 returns the armature to its unmoved position shown by the broken lines in Fig. 2.

Adjacent the side of motor 12 away from the clock mechanism 33 is a thermostat 43 having a bimetallic element 44 mounted at the inner end of its volute portion on a shaft 45 supported by the bracket 18 and the gear box 20. Insulatingly mounted on the free end of the bimetallic element 44 is a contact 46 engageable in its movement in one direction with an adjustable contact element 47 threaded in one of two laterally bent end portions 48' of a fixed support 48 which is secured at its lower end on the base 11. The support 48 is formed in two sections insulatingly joined by a member 52 riveted to the adjacent section ends. Movement of the bimetallic element 44 in a direction away from the contact 47 is limited by an adjustable stop-screw 49 threaded in the other laterally bent portion 48' of the support 48. An armature 50 is fixed to the mid-portion of the bimetallic element 44 and is adapted to be attracted by a permanent magnet 51, secured on the support 48, to affect snap-action of the contacts in their engaging and disengaging movements by the bimetallic element, in a manner well known in the art.

In Fig. 4 is shown a space heating control system in which the numeral 53 indicates the encased thermostat and clock mechanism of Fig. 1. The thermostats are independently connected by wires 54 and 54', and common wire 55, to apparatus, generally indicated at 56, for controlling the heating of the spaces in which the thermostats are located. This apparatus may be of generally any type, but is preferably of that type which includes a synchronously driven timing or programming device, such as is usually associated with an oil-burner or stoker control system. A cam 57, continuously driven by the device, is arranged to periodically operate a pair of contact fingers 58 and 59 which are connected by wires 55 and 60 to the coil 14 of motor 12, in series with a source of energy (not shown) to which wires 61 lead. This source of energy may conveniently be common to the heating control apparatus. The impulse motors are connected in parallel, and the wire 55 serves as a common return for both the impulse motors and the thermostats. The cam 57, when employed to control the particular time mechanism shown in Figs. 1-3, is arranged to momentarily close the contact fingers 58 and 59 once per minute, and at that rate of operation the heat produced in the motor is so small that the thermostat, even when it is closely associated with the motor, is not appreciably affected. The cam 57 may be mechanically connected to operate a clock 62; however, when no programming device is available to operate the cam, the clock itself may be provided with motor means which then serve to drive the cam.

Referring again to Fig. 1, within the gear box 20 is mechanism (not shown) which is adapted to automatically change the day and night setting of the thermostat. This mechanism is driven by shaft 32 through bevel gears 62' and 63 and shafts 63' and 64 and is adapted to rock the shaft 45, on which the bimetallic element 44 is mounted, through a predetermined arc at a predetermined time so that the temperature of the space in which the thermostat is located may be controlled at different levels for night and day control.

Another feature of the invention is the provision of means for reducing the operating temperature differential of snap-action thermostats. An arm 65 mounted on the end of shaft 16 adjacent the thermostat 43, carries on its free end a light spring-wire 66 which is adapted to engage the bimetallic element 44 each time that the motor 12 is energized. This periodic engagement causes only a slight "jarring" of the bimetallic element and is effective only to facilitate the initial movement of the element when the magnetic force and the internal stress acting on the element, due to its temperature, approach the point at which movement normally would occur. It has been found in practice that by so jarring the element the differential of operation of the thermostat can be reduced from about 2° to ¼°. If the element 44 is in its open-circuit position, and the forces then acting thereon are balanced, wire 66, upon coming into engagement with the element, will exert a slight force thereon in the direction in which the member is influenced to move under the force of the magnet 50, and will tend to overcome the inertia of the element and permit the same to move under the influence of the magnet. If, however, the element is in its closed-circuit position, as shown in Fig. 2, the force exerted by the wire 66 is opposite to the direction in which the member is influenced to move by its internal stress. Then the reaction to the force is such that the element tends to "rebound," so that its initial movement in the direction in which its internal stress urges it is facilitated. It is not essential that a member such as the wire 66 be provided to directly engage the bimetallic element, inasmuch as the vibration of the impulse motor transmitted through the various parts of the thermostat to the bimetallic element can be sufficient, under certain conditions, to effect the desired result. It will be apparent that the motor employed for effecting the reduction in the operating differential could be of any type, mechanical or electrical, and whether constantly or periodically operated.

While I have herein shown and described, by way of illustration, a specific embodiment of my invention, I wish it to be understood that modifications may be made without departing from the spirit of the invention, and that I intend therefore to be limited only by the scope of the appended claim.

I claim as my invention:

In a system for controlling temperature and having an electric circuit: a thermostat having a movable member responding to temperature conditions and controlling said circuit, means for producing a snap-action in the operative movement of said member, a timer cooperating with said thermostat in the control of said circuit, an intermittently-operated electric motor comprising an oscillating armature for operating said timer, said motor being energized at such infrequent intervals and for such brief periods as to have no appreciable heating effect upon the thermostat, and means operated in response to the energization of said motor for reducing the differential of operation of the thermostat, said last-named means comprising means oscillating with said armature for applying to said member a tapping force which is of such magnitude that operative movement of the member is effected by said force only if the temperature of the thermostat is near that at which said movement should occur.

WILLIAM A. RAY.